G. F. DISCHER.
BUMPER BRACKET.
APPLICATION FILED APR. 11, 1910.

1,052,224.

Patented Feb. 4, 1913.

Witnesses:

Inventor:
Frank F. Discher
By Winkler Flanders Bottum Fawsett
Attorneys.

UNITED STATES PATENT OFFICE.

GRANT F. DISCHER, OF MILWAUKEE, WISCONSIN.

BUMPER-BRACKET.

1,052,224.  Specification of Letters Patent.  Patented Feb. 4, 1913.

Application filed April 11, 1910. Serial No. 554,632.

*To all whom it may concern:*

Be it known that I, GRANT F. DISCHER, a citizen of the United States, residing at Milwaukee, in the county of Milwaukee and State of Wisconsin, have invented certain new and useful Improvements in Bumper-Brackets, of which the following is a specification, reference being had to the accompanying drawing, forming a part thereof.

This invention relates to bumper brackets for automobiles and similar vehicles, and the purpose of the invention is to provide a bumper bracket so constructed that it can be readily clamped or fastened to the frame members or springs of an automobile in such a manner that the thrust or strain produced by the bumper coming in contact with an object will be transmitted directly to the frame or spring of the automobile and preferably against the end thereof, instead of being transmitted laterally through bolts projecting from the frame of the automobile, as has heretofore been the practice.

This invention also provides for attaching the brackets to the frame or spring without cutting or drilling and consequently weakening the frame as has heretofore been the custom, and it also provides the several features of construction to be more specifically pointed out in the specification and claims.

In some automobiles full elliptic springs are used, and in others semi-elliptic springs are used at the front of the automobile, and for brevity in this specification and the claims the term "side bar" will be used in a generic sense to designate either a side bar of an automobile frame, the frame itself, or a full elliptic spring, because the bumper bracket which is the subject matter of this invention may transmit a thrust or strain either against a side bar of an automobile frame, or against the frame itself, or against a full elliptic spring, according to the special construction of the automobile to which it may be applied.

Figure 1:
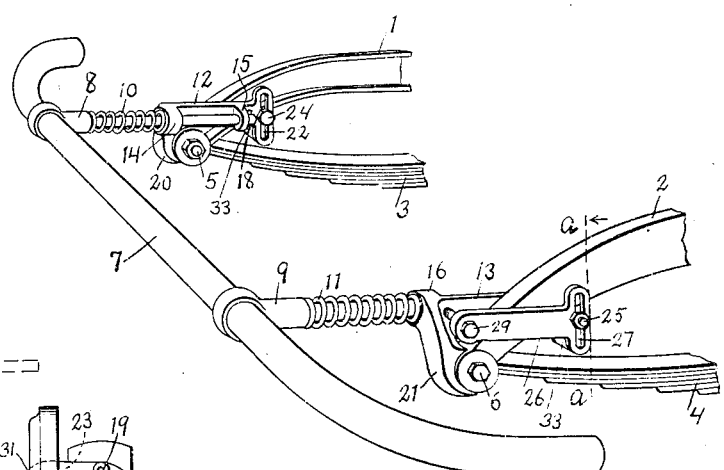
Figure 3:
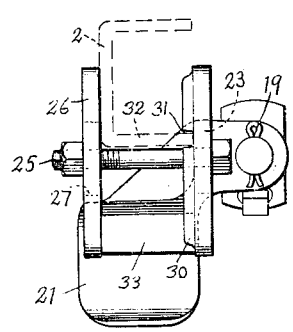
Figure 2:
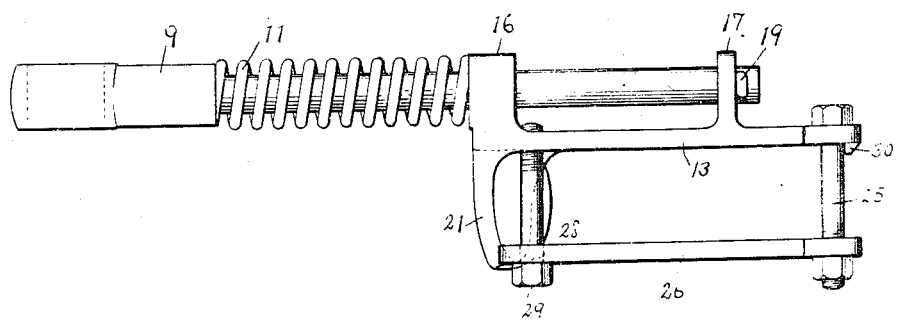

Referring to the drawings which accompany this specification and form a part thereof, and on which drawings the same reference characters are used to designate the same elements wherever they may appear in each of the several views, and which drawings illustrate an embodiment of this invention, Figure 1 is a perspective view of a bumper applied to an automobile, only a part of the automobile being shown; Fig. 2 is a plan view on an enlarged scale of a bumper bracket detached; and Fig. 3 is an elevation on an enlarged scale from the rear of a bracket, the view being taken on the line *a—a* of Fig. 1, a part of the frame of the automobile being indicated in dotted lines.

Referring to the drawing, the reference numerals 1 and 2 designate the front ends of the side bars of the frame of an automobile, and 3 and 4, semi-elliptic springs connected thereto at their front ends by bolts 5 and 6. This specific construction is illustrated merely for convenience and as showing a very common type of automobile construction. In some cases however, full elliptic springs are used, and in such cases the bolts 5 and 6 shown by the drawings would be the bolts which unite the upper and lower parts of the springs, the general contour of such construction would however, be about the same as illustrated by Fig. 1 of the drawings, as will be readily understood.

The reference numeral 7 designates a bumper bar which is supported by slidable rods 8 and 9 backed by yieldable members, as for example, springs 10 and 11, in the customary manner.

The brackets 12 and 13 are preferably made right and left handed, and as illustrated by the drawings, are intended to be placed inside of the side members 1 and 2 of the frame. These brackets are provided with outstanding lugs 14, 15, 16 and 17 respectively, which are bored to receive the slidable rods 8 and 9, said rods being slidable through said lugs against the tension of the springs 10 and 11, and retained within the bores of said lugs by cotter pins 18 and 19. The brackets are also provided with laterally and downwardly extending curved lugs 20 and 21, which are adapted to bear or abut against the forward ends of the side bars 1 and 2, whereby the thrust from the bumper bar 7 will be transmitted directly against the ends of said side bars. The brackets 12 and 13 are provided at their rear ends with vertically elongated slots 22 and 23, adapted to receive bolts 24 and 25, by which clamping members 26 may be clamped against the side bars. The clamping members 26 are provided at their rear ends with vertically elongated slots 27, and at their front ends with apertures 28, through which bolts 29 are adapted to extend. The brackets 12 and 13 are bored and tapped near their forward ends to receive the screwthreaded ends of bolts 29, as clearly shown by the drawings. The rear ends of brackets 12 and 13 are provided with projecting lugs 30, which are intended to be filed away, as clearly indicated by Fig. 3 of the drawings, to provide a notch or recess 31 to receive a flange 32 of a side bar of the frame to secure the brackets from any tendency to tip.

In applying the brackets to an automobile, they are placed in position thereon, as shown by Fig. 1, and as the curves of the front ends of the side bars of automobile frames vary, they are adjusted so that the rods 8 and 9 are substantially horizontal. Then the lugs 30 are marked and filed or cut away so as to receive the flanges of the side bars 1 and 2 of the frame, as clearly shown by Fig. 3. Spacing blocks 33 are then inserted between the brackets 12 or 13, and the clamping members 26, and the bolts 24, 25 and 29 are tightened, the bolts 29 being tightened as in an ordinary vise or clamp, so that the clamping members 26 and brackets 12 and 13 lie true and parallel with the side bars 1 and 2 of the frame.

With this construction it will be observed that the side bars of the frame are neither cut nor bored, so they are not weakened, and the thrust or strain from the bumper bar 7 is transmitted directly against the ends of the side bars of the frame, while the curved portion of the lugs 20 and 21 in connection with the clamping means effectually brace or lock the brackets against vertical displacement.

What is claimed is:

1. The combination of a bumper bracket provided with a lug adapted to abut against the front end of the side bar of an automobile, and means to removably clamp said bracket to said side bar.

2. The combination of a bumper bracket provided with a lug adapted to abut against the front end of a side bar of an automobile frame, a removable clamping member, and bolts to clamp said bracket against said side bar.

3. The combination of a bumper bracket provided with a lug adapted to engage the end of the side bar of an automobile frame, a clamping member provided with an aperture, a bolt extending through said aperture and engaging with the bracket, said bracket and said clamping member each being provided with a vertically elongated slot at its rear end, and a bolt and a spacing member to coöperate with the bracket and clamping member to clamp the bracket to said side bar.

4. The combination of a bumper bracket provided with a lug adapted to engage the end of a side bar of an automobile frame, said bracket being provided with a lug which is notched to receive a flange of said side bar, and a removable clamping member and bolts for clamping said bracket to said side bar.

5. In an automobile bumper the combination of brackets having parts adapted to abut against the front ends of the side bars of an automobile, means for securing said brackets to the side bars, and a bumper bar connected with said brackets in approximately the same horizontal plane with said abutting parts to directly transmit the shock of an impact to the ends of said side bars.

6. The combination with a bumper bracket of detachable clamping means for securing said bumper bracket to an automobile, a slidable rod adapted to support a bumper bar, and a yieldable member for backing said slidable rod, said bumper bracket being provided with a curved lug to abut against the front end of the side bar of an automobile frame.

7. A bumper bracket adapted to be secured to the side bar of an automobile and having a part adapted to abut against the front end of the side bar to transmit the shock of an impact to the end of the side bar.

8. The combination with the side bar of an automobile, of a bumper bracket and means for attaching said bumper bracket to the automobile, said bumper bracket being provided with a part adapted to abut against the front end of the side bar to transmit the shock of an impact to the end of the side bar and thereby relieve the attaching means from the shock of an impact.

9. The combination of a bumper bracket having a part adapted to abut against the end of the side bar of an automobile, and means for securing said bracket to said side bar at a distance from the spring bolt in the front end of said side bar, whereby the shock of an impact is transmitted directly to the end of the side bar independently of said spring bolt.

In witness whereof I hereto affix my signature in presence of two witnesses.

GRANT F. DISCHER.

Witnesses:
FRANK E. DENNETT,
CHAS. L. GOSS.